US012812496B2

(12) United States Patent
Cheng et al.

(10) Patent No.: US 12,812,496 B2
(45) Date of Patent: Nov. 24, 2026

(54) SIDELINK RELAY MOBILITY TRIGGER EVENT DESIGN

(71) Applicant: QUALCOMM Incorporated, San Diego, CA (US)

(72) Inventors: Peng Cheng, Beijing (CN); Karthika Paladugu, San Diego, CA (US); Wanshi Chen, San Diego, CA (US); Ozcan Ozturk, San Diego, CA (US); Kapil Gulati, Belle Mead, NJ (US); Gavin Bernard Horn, La Jolla, CA (US); Hong Cheng, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 545 days.

(21) Appl. No.: 17/996,175

(22) PCT Filed: May 29, 2020

(86) PCT No.: PCT/CN2020/093135
§ 371 (c)(1),
(2) Date: Oct. 13, 2022

(87) PCT Pub. No.: WO2021/237646
PCT Pub. Date: Dec. 2, 2021

(65) Prior Publication Data

US 2023/0262569 A1 Aug. 17, 2023

(51) Int. Cl.

| | |
|---|---|
| ***H04W 36/32*** | (2009.01) |
| ***H04W 36/00*** | (2009.01) |
| ***H04W 36/30*** | (2009.01) |

(52) U.S. Cl.
CPC ....... *H04W 36/32* (2013.01); *H04W 36/0058* (2018.08); *H04W 36/033* (2023.05); *H04W 36/30* (2013.01)

(58) Field of Classification Search
CPC ..... H04W 88/04; H04W 76/14; H04W 76/10; H04W 76/23; H04W 92/18;
(Continued)

(56) References Cited

U.S. PATENT DOCUMENTS

2015/0230180 A1* 8/2015 Lim .................... H04W 76/14 370/315
2017/0013653 A1 1/2017 Suzuki et al.
(Continued)

FOREIGN PATENT DOCUMENTS

CN 107889080 A 4/2018
CN 109417695 A 3/2019
(Continued)

OTHER PUBLICATIONS

Zhou et al. "Improving cellular downlink throughput by multi-hop relay-assisted outband D2D Communications", EURASIP Journal on Wireless Communications and Networking, 2017 (Year: 2017).*
(Continued)

*Primary Examiner* — Quoc Thai N Vu
(74) *Attorney, Agent, or Firm* — Patterson + Sheridan LLP

(57) ABSTRACT

Aspects of the present disclosure relate to wireless communications, and more particularly, to techniques for a mobility trigger event for switching a remote user equipment (UE) between a direct connection (e.g., Uu) to a network and an indirect connection (e.g., PC5) to the network via a relay UE connected to a relay.

32 Claims, 13 Drawing Sheets

(58) Field of Classification Search
CPC . H04W 36/0058; H04W 36/30; H04W 40/22; H04W 36/00; H04W 36/0016; H04W 36/00837; H04W 40/02; H04W 36/03; H04W 36/16; H04W 36/32; H04W 36/033; H04W 48/20; H04B 17/309; H04B 7/15542
See application file for complete search history.

(56) References Cited

U.S. PATENT DOCUMENTS

| | | | | |
|---|---|---|---|---|
| 2017/0093541 | A1 | 3/2017 | Pan et al. | |
| 2017/0150490 | A1* | 5/2017 | Chen | H04W 76/27 |
| 2018/0124674 | A1 | 5/2018 | Vutukuri et al. | |
| 2018/0295534 | A1 | 10/2018 | Huang et al. | |
| 2019/0150057 | A1* | 5/2019 | Wang | H04W 36/16<br>370/311 |
| 2019/0313315 | A1 | 10/2019 | Xu et al. | |
| 2020/0100308 | A1 | 3/2020 | Lee et al. | |
| 2021/0282098 | A1* | 9/2021 | Luo | H04W 72/51 |
| 2021/0289401 | A1* | 9/2021 | Xu | H04W 36/0009 |

FOREIGN PATENT DOCUMENTS

| | | | | |
|---|---|---|---|---|
| CN | 109479221 | A | 3/2019 | |
| WO | WO-2017039735 | A1 * | 3/2017 | H04W 76/10 |

OTHER PUBLICATIONS

Nokia, et al., "Path Switch Between Direct and Indirect Communications", 3GPP Draft, 3GPP TSG-RAN WG2 Meeting #98, R2-1704328_D2D_Path_Switch_Procedure, 3rd Generation Partnership Project (3GPP), Mobile Competence Centre, 650, Route Des Lucioles, F-06921 Sophia-Antipolis Cedex, France, vol. RAN WG2. No. Hangzhou, China, May 15, 2017-May 19, 2017 May 14, 2017 (May 14, 2017), XP051274903, 4 Pages, paragraph [0002]—paragraph [0003], the whole document.
Supplementary European Search Report—EP20937945—Search Authority—Munich—Jan. 2, 2024.
International Search Report and Written Opinion—PCT/CN2020/093135—ISA/EPO—Mar. 3, 2021.
Sony: "Scope and Phasing of D2D Relay Enhancements", 3GPP TSG RAN WG2 Meeting #94, R2-163936, May 13, 2016 (May 13, 2016), 8 Pages, the whole document.

* cited by examiner

SIDELINK RELAY MOBILITY TRIGGER EVENT DESIGN

CROSS-REFERENCE TO RELATED APPLICATIONS

This application is a national stage application under 35 U.S.C. 371 of PCT/CN2020/093135, filed May 29, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for a mobility trigger event for switching a remote user equipment (UE) between a direct connection to a network and an indirect connection to the network via a relay UE connected to a relay.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between user equipments (UEs) and a network.

Certain aspects provide a method for wireless communications by a remote user equipment (UE). The method generally includes detecting a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity and sending, in response to the detection, a measurement report including measurements for one or more relay UEs and one or more network entities.

Certain aspects provide a method for wireless communications by a relay use equipment. The method generally includes configuring a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity and receiving a measurement report, sent by the remote UE after detecting the trigger event, including measurements for one or more relay UEs and one or more network entities.

Certain aspects provide a method for wireless communications by a serving network entity. The method generally includes configuring a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity and receiving a measurement report, sent by the remote UE after detecting the trigger event, including measurements for one or more relay UEs and one or more network entities.

Certain aspects provide a remote user equipment (UE). The remote UE generally includes means for detecting a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity and means for sending, in response to the detection, a measurement report including measurements for one or more relay UEs and one or more network entities.

Certain aspects provide a relay user equipment (UE). The relay UE generally includes means for configuring a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity and means for receiving a measurement report, sent by the remote UE after detecting the trigger event, including measurements for one or more relay UEs and one or more network entities.

Certain aspects provide a serving network entity. The serving network entity generally includes means for configuring a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity and means for receiving a measurement report, sent by the remote UE after detecting the trigger event, including measurements for one or more relay UEs and one or more network entities.

Certain aspects provide a remote user equipment (UE). The remote UE generally includes a processing system configured to detect a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity and a transmitter configured to send, in response to the detection, a measurement report including measurements for one or more relay UEs and one or more network entities.

Certain aspects provide a relay user equipment (UE). The relay UE generally includes a processing system configure to configure a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity and a receiver configured to receive a measurement report, sent by the remote UE after detecting the trigger event, including measurements for one or more relay UEs and one or more network entities.

Certain aspects provide a serving network entity. The serving network entity generally includes a processing system configured to configure a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity and a receiver configured to receive a measurement report, sent by the remote UE after detecting the trigger event, including measurements for one or more relay UEs and one or more network entities.

Certain aspects provide an apparatus for wireless communications by a remote user equipment (UE). The apparatus generally includes a processing system configured to detect a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity and an interface configured to provide, in response to the detection, a measurement report, for transmission, including measurements for one or more relay UEs and one or more network entities.

Certain aspects provide an apparatus for wireless communications by a relay user equipment (UE). The apparatus generally includes An apparatus for wireless communications by a relay user equipment (UE), comprising a processing system configure to configure a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity and an interface configured to obtain a measurement report, sent by the remote UE after detecting the trigger event, including measurements for one or more relay UEs and one or more network entities.

Certain aspects provide an apparatus for wireless communications by a serving network entity. The apparatus generally includes a processing system configured to configure a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity and an interface configured to obtain a measurement report, sent by the remote UE after detecting the trigger event, including measurements for one or more relay UEs and one or more network entities.

Certain aspects provide a computer-readable medium for wireless communications by a remote user equipment (UE). The computer-readable medium generally includes instructions executable to detect a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity and send, in response to the detection, a measurement report including measurements for one or more relay UEs and one or more network entities.

Certain aspects provide a computer-readable medium for wireless communications by a relay user equipment (UE). The computer-readable medium generally includes instructions executable to configure a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity entity and receive a measurement report, sent by the remote UE after detecting the trigger event, including measurements for one or more relay UEs and one or more network entities.

Certain aspects provide a computer-readable medium for wireless communications by a serving network entity. The computer-readable medium generally includes instructions executable to configure a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity and receive a measurement report, sent by the remote UE after detecting the trigger event, including measurements for one or more relay UEs and one or more network entities.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
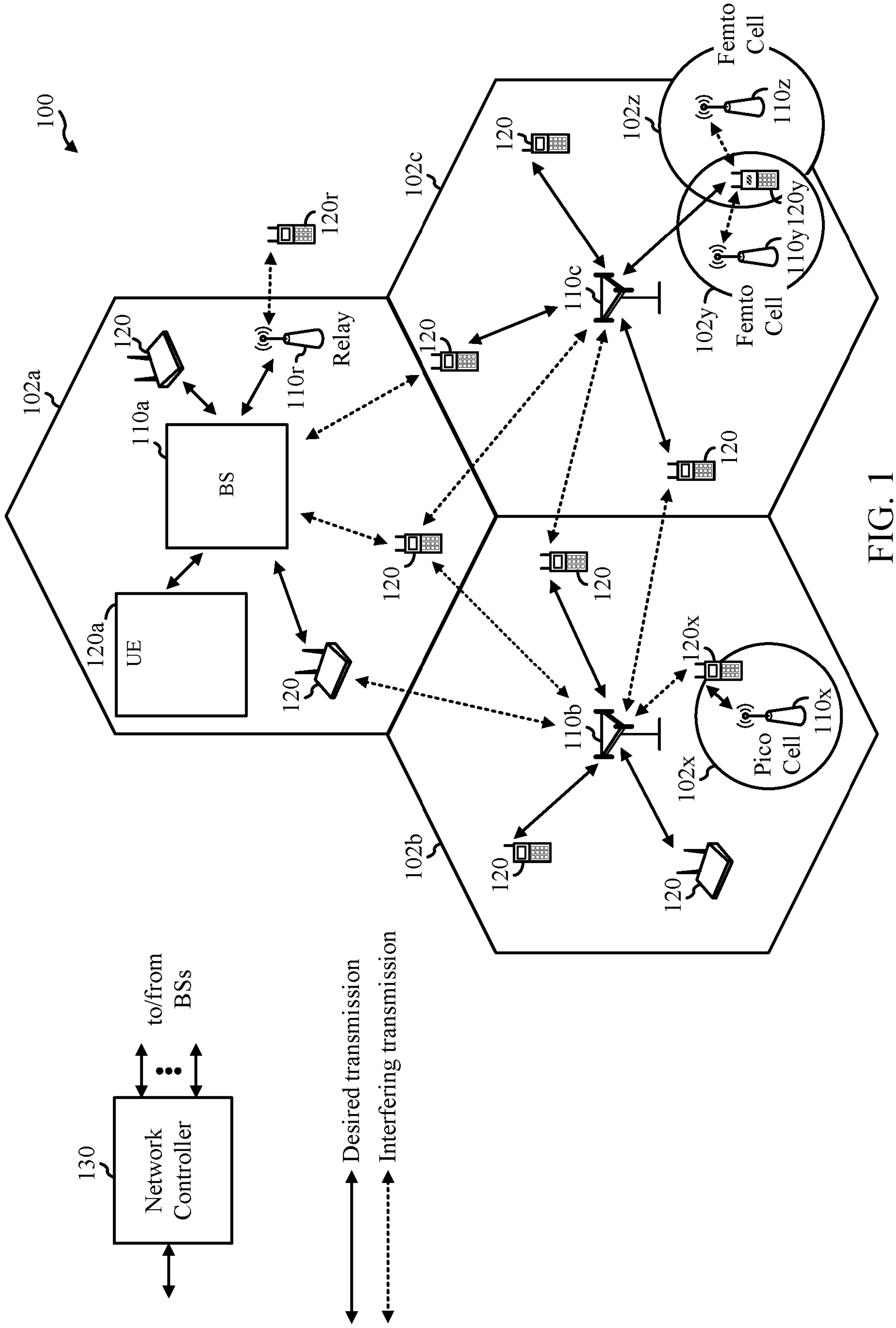
FIG. 1 is a block diagram conceptually illustrating an example telecommunications system, in accordance with certain aspects of the present disclosure.

Aspects of the present disclosure relate to wireless communications, and more particularly, to techniques for a mobility trigger event for switching a remote user equipment (UE) between a direct connection to a network and an indirect connection to the network via a relay UE connected to a relay. The mobility trigger event may involve measurements for multiple wireless nodes, which may include relay UEs, network entities (e.g., serving/neighbor base stations), or both.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UE 120*a*, relay UE 120*r*, and/or BS 110*a* of FIG. 1 may be configured to perform operations 1100, 1200, and 1300 described below with reference to FIGS. 11, 12, and 13, respectively, to trigger and/or participate in a mobility procedure to switch a remote UE between a direct network connection and an indirect connection via a relay UE.

As illustrated in FIG. 1, the wireless communication network 100 may include a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
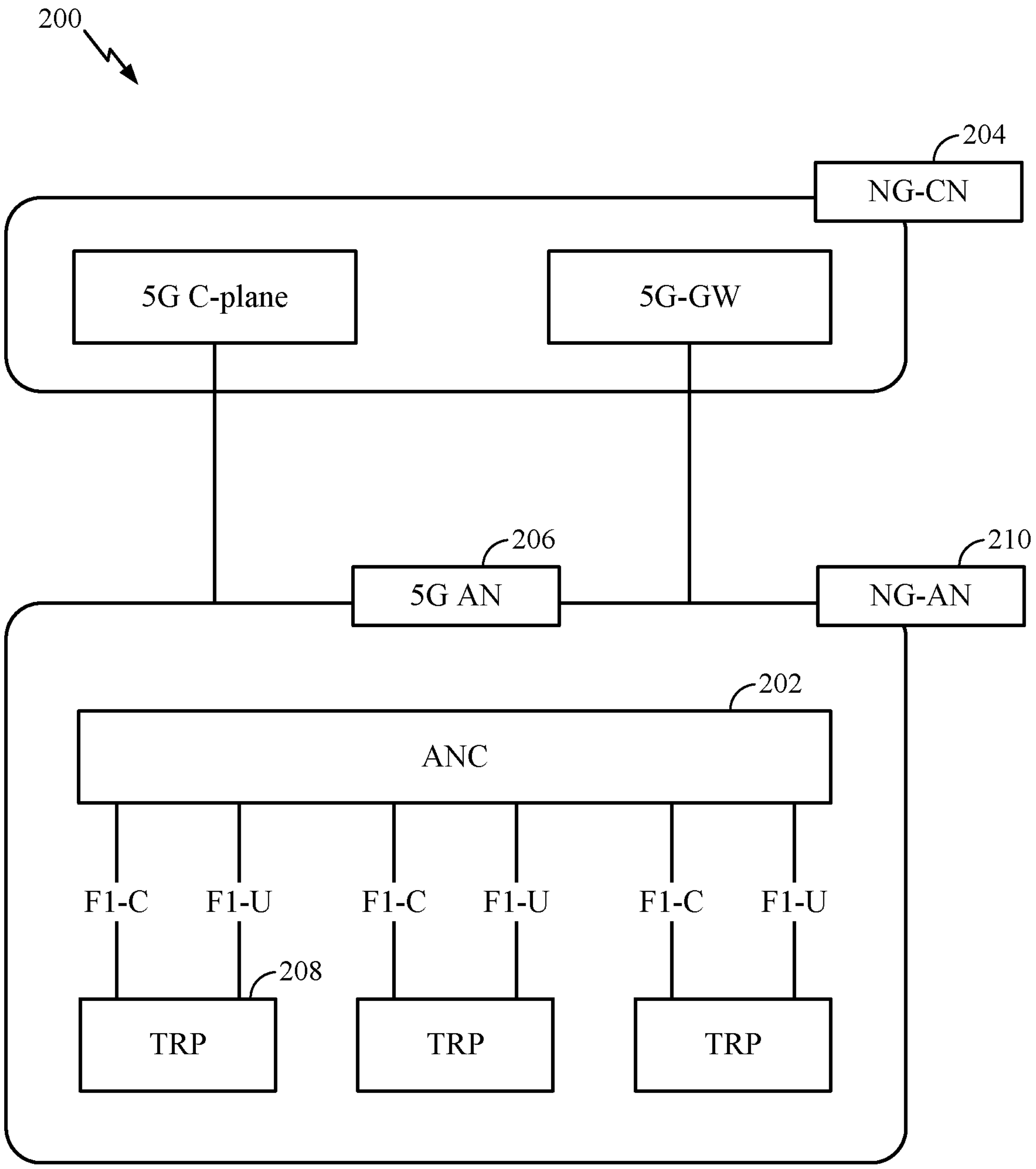
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
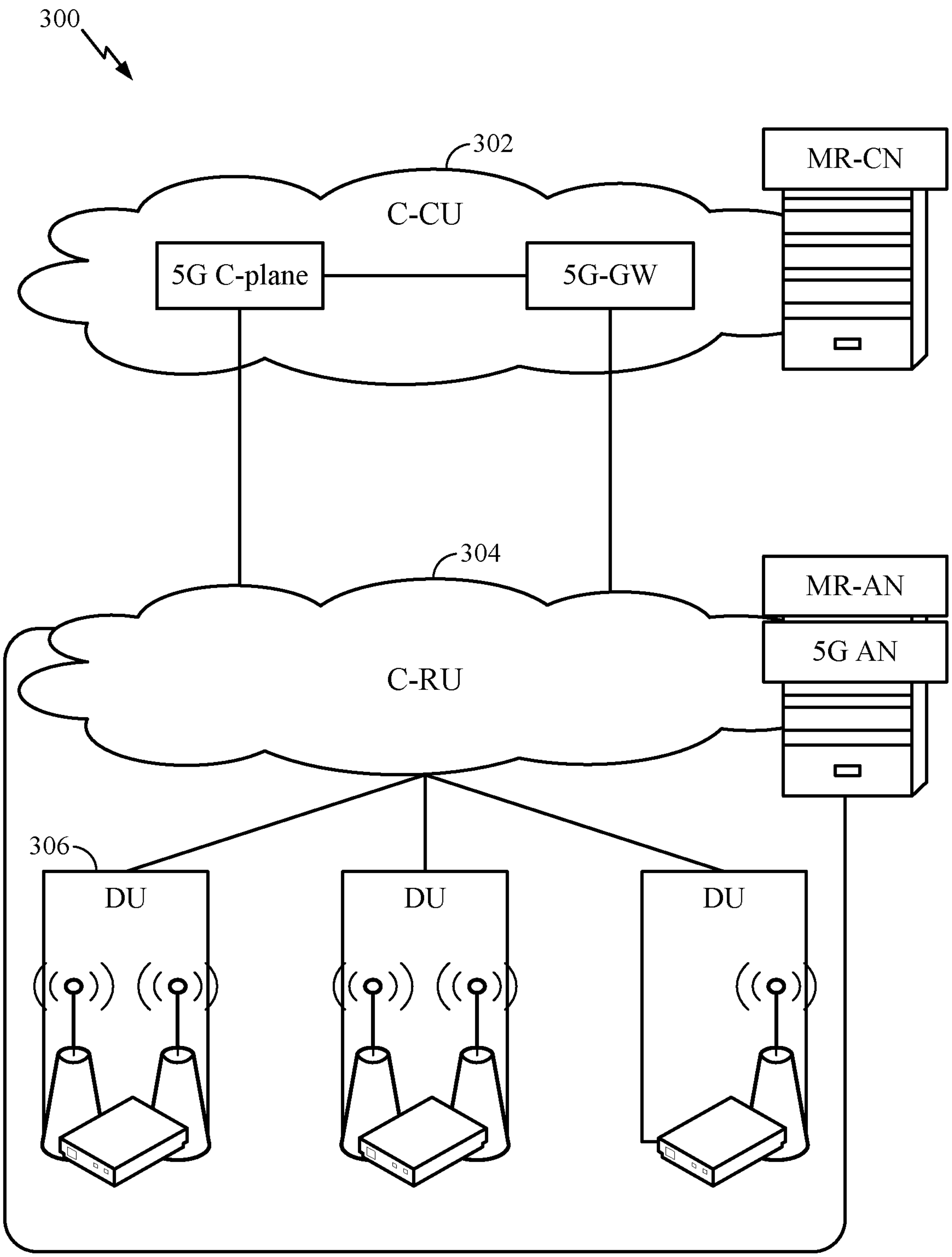
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
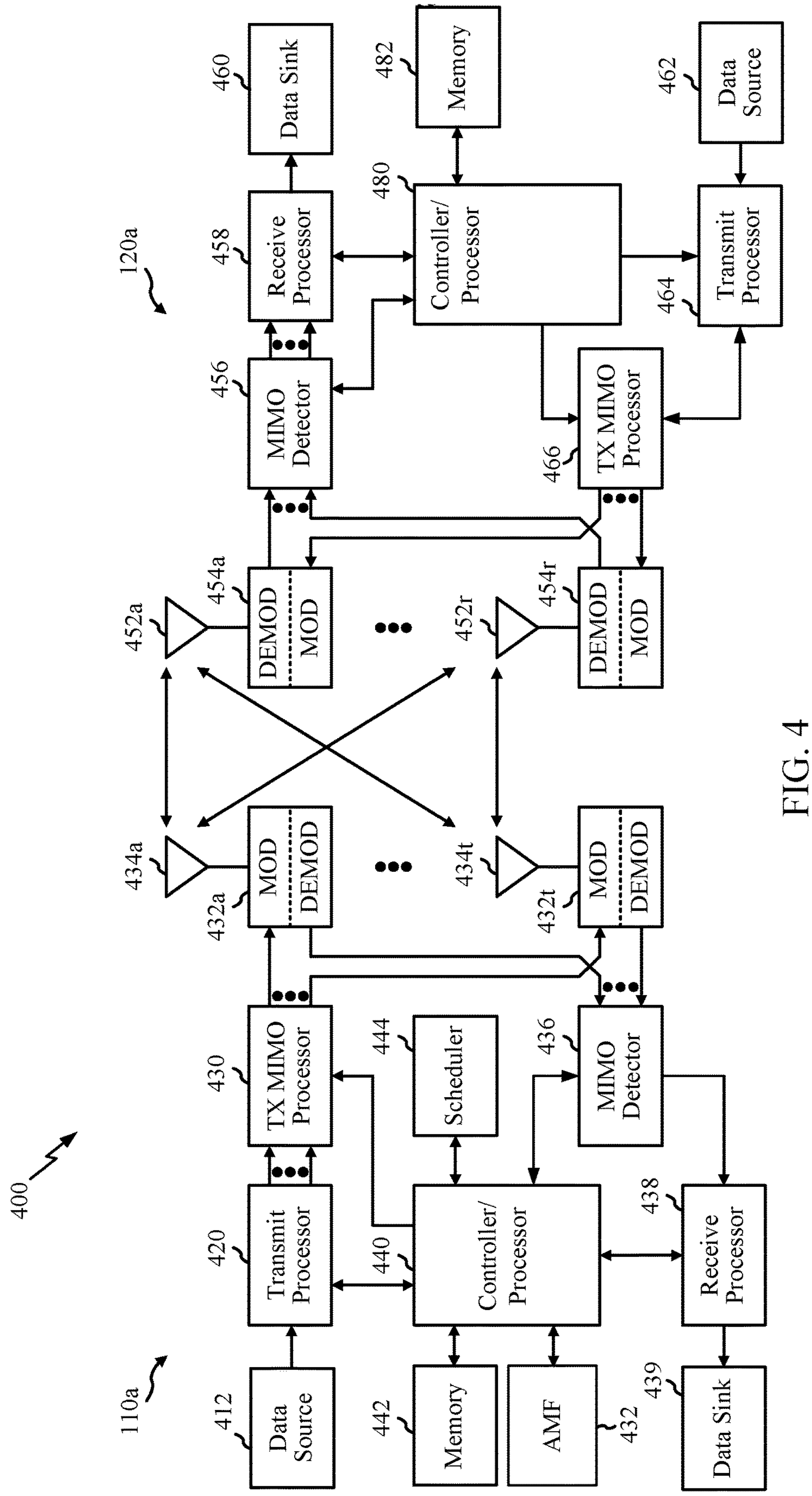
FIG. 4 is a block diagram conceptually illustrating a design of an example base station (BS) and user equipment (UE), in accordance with certain aspects of the present disclosure.

FIG. 4 illustrates example components of BS **110*a* and UE 120*a* (as depicted in FIG. 1), which may be used to implement aspects of the present disclosure. For example, antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein with reference to FIGS. 11, 12, and 13** to trigger and/or participate in a mobility procedure to switch a remote UE between a direct network connection and an indirect connection via a relay UE.

At the BS **110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432***a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein with reference to FIGS. 11, 12, and 13.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
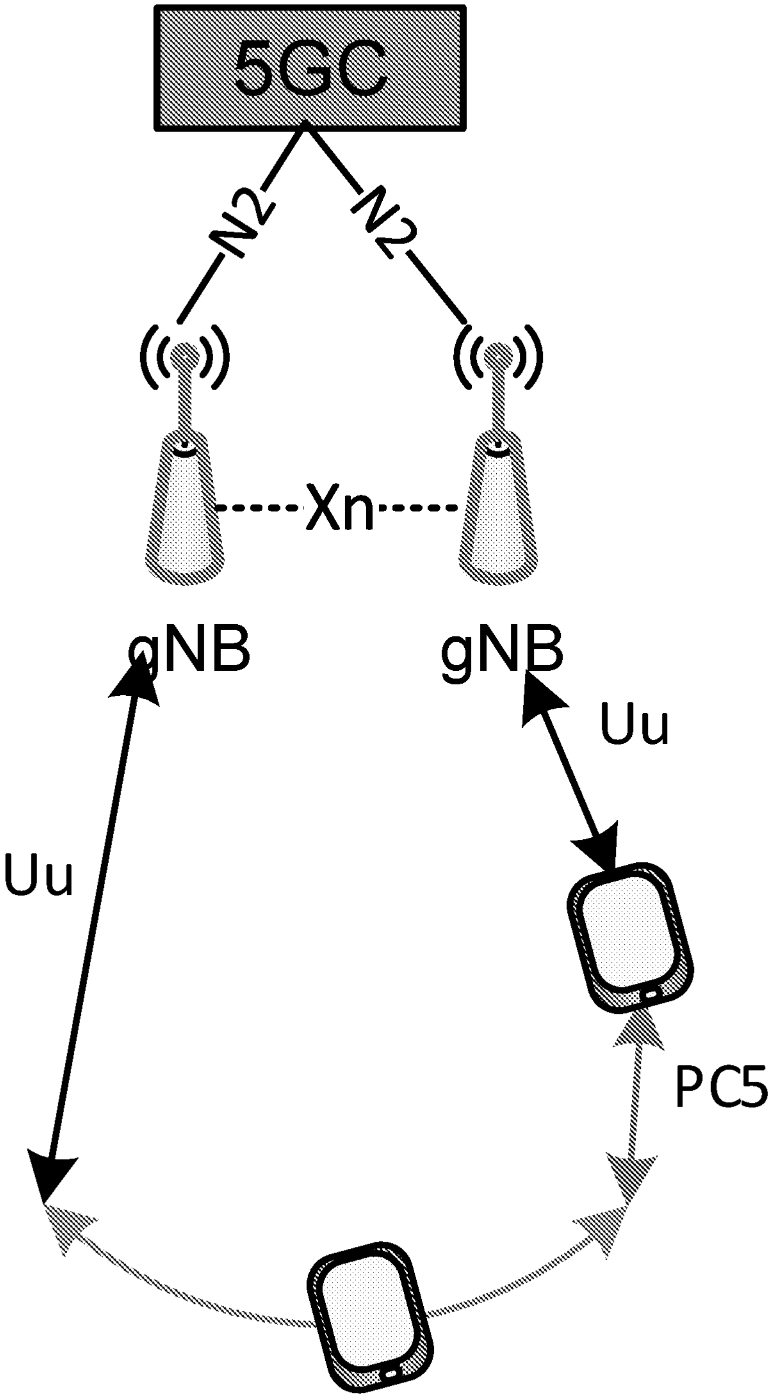
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
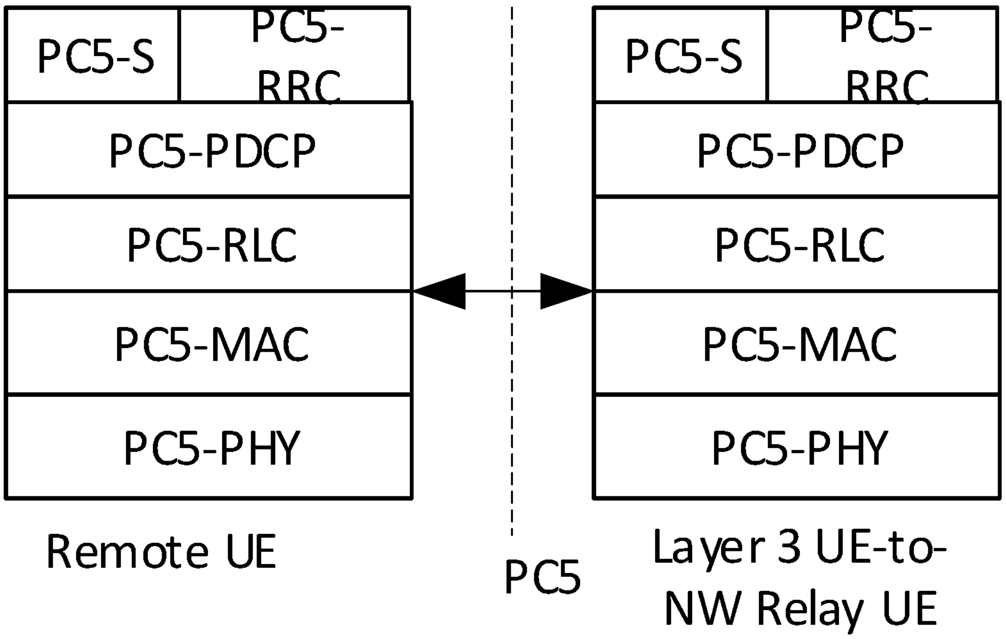
FIG. 6 is an example block diagram illustrating a control plane protocol stack on L3, when there is no direct connection path between the remote UE and the network node, in accordance with certain aspects of the present disclosure.
Figure 7:
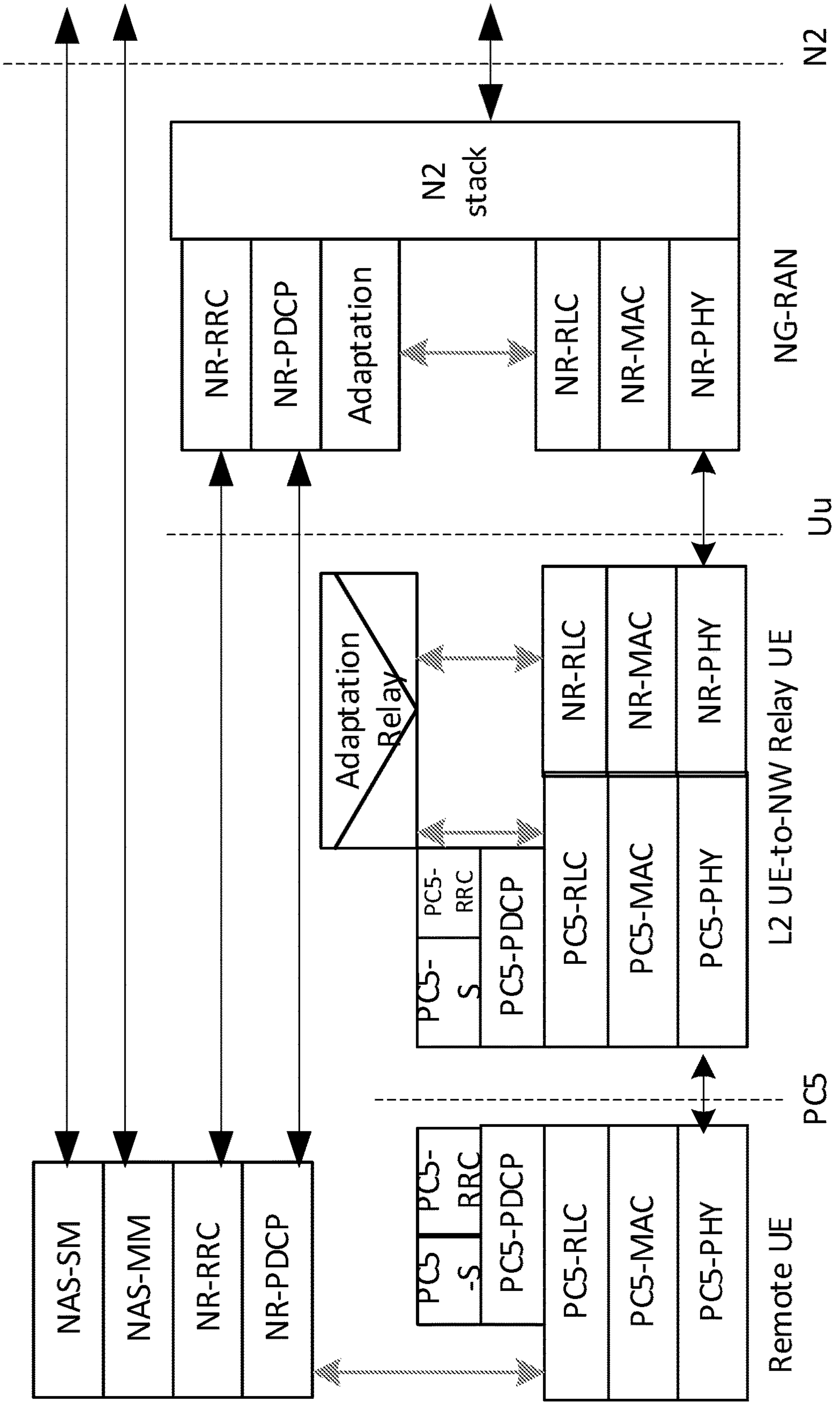
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Example Sidelink Relay Mobility Trigger Event Design

Aspects of the present disclosure relate to wireless communications, and more particularly, to techniques for a mobility trigger event for switching a remote user equipment (UE) between a direct connection to a network and an indirect connection to the network via a relay UE connected to a relay.

For example, the techniques described herein may help facilitate a mobility event to switch a remote UE from a Uu path (through which the remote UE is connected to gNB directly over Uu) to a PC5 path (through which the remote UE is connected to the gNB via a relay UE) or from a PC5 path to a Uu path, as shown in FIG. 5. The techniques may be applied to scenarios involving L2 and/or L3 type relay.

Conventional systems define various trigger events for mobility procedures to switch within a same RAT (Intra-RAT events) or between different RATs (Inter-RAT events). Intra-RAT events include Events A1 (Serving becomes better than threshold), A2 (Serving becomes worse than threshold), A3 (Neighbor becomes offset better than a secondary primary cell (SpCell)), A4 (Neighbor becomes better than threshold), A5 (SpCell becomes worse than threshold1 and neighbor becomes better than threshold2), and A6 (Neighbor becomes offset better than SCell). Inter-RAT events include Events B1 (Inter RAT neighbor becomes better than threshold) and B2 (PCell becomes worse than threshold1 and inter RAT neighbor becomes better than threshold2).

Conventional systems also define various trigger events for mobility procedures to switch between NR sidelink devices (relay UEs). Such sidelink trigger events include Events C1 (The NR sidelink channel busy ratio is above a threshold), C2 (The NR sidelink channel busy ratio is below a threshold), S1 (peer UE SL-RSRP becomes better than threshold) and S2 (Serving peer UE SL-RSRP becomes worse than threshold).

Various issues exist when considering mobility triggers for mobility procedures that involve sidelink relays, due to the additional hop of the signal path when using a relay UE. In principle, the additional hop means the event may be triggered when:

$$\frac{PacketSize}{\text{rate(Uu\_remote)}} > \frac{PacketSize}{\text{rate(relay}\langle - \rangle\text{remote)}} + \frac{PacketSize}{\text{rate(Uu\_relay)}} + \text{delay} + \text{delta};$$

in case of Uu→PC5 switch. The delay generally refers to the delay caused by forwarding processing (including scheduling) in relay node, while delta refers to a margin designed to ensure the link switch is necessary. In case of a PC5→Uu switch, the event may be triggered when:

$$\frac{PacketSize}{\text{rate(Uu\_remote)}} + \text{delta} < \frac{PacketSize}{\text{rate(relay}\langle - \rangle\text{remote)}} + \frac{PacketSize}{\text{rate(Uu\_relay)}} + \text{delay}.$$

However, due to the difficulty for a remote UE to timely know the rate (Uu relay) and delay of forwarding processing, conventional reference signal based event triggers (RSRP/RSRQ) may be more practical. Another potential issue is due to different measurement RS between Uu and PC5. With Uu, CSI-RS or SSB is typically configured and used as RS for mobility purposes, while DMRS of PSSCH is used for PC5. This potentially creates issues when comparing measurements taken for RS of different types.

Figure 8:
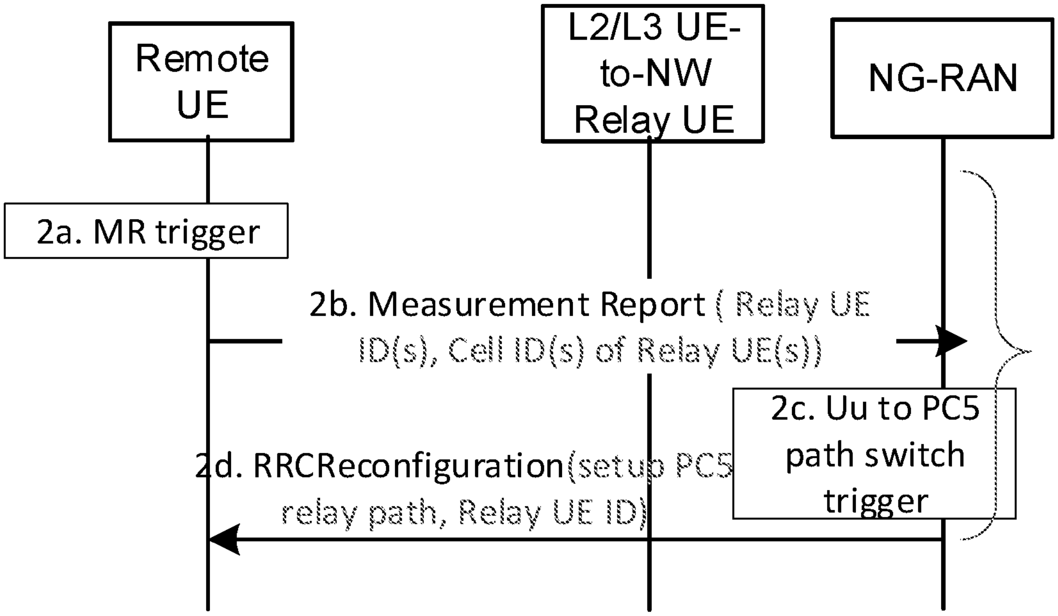
FIG. 8 illustrates an example mobility procedure to switch a remote UE from a direct network connection to an indirect connection via a relay UE, that may be triggered in accordance with certain aspects of the present disclosure.
Figure 9:
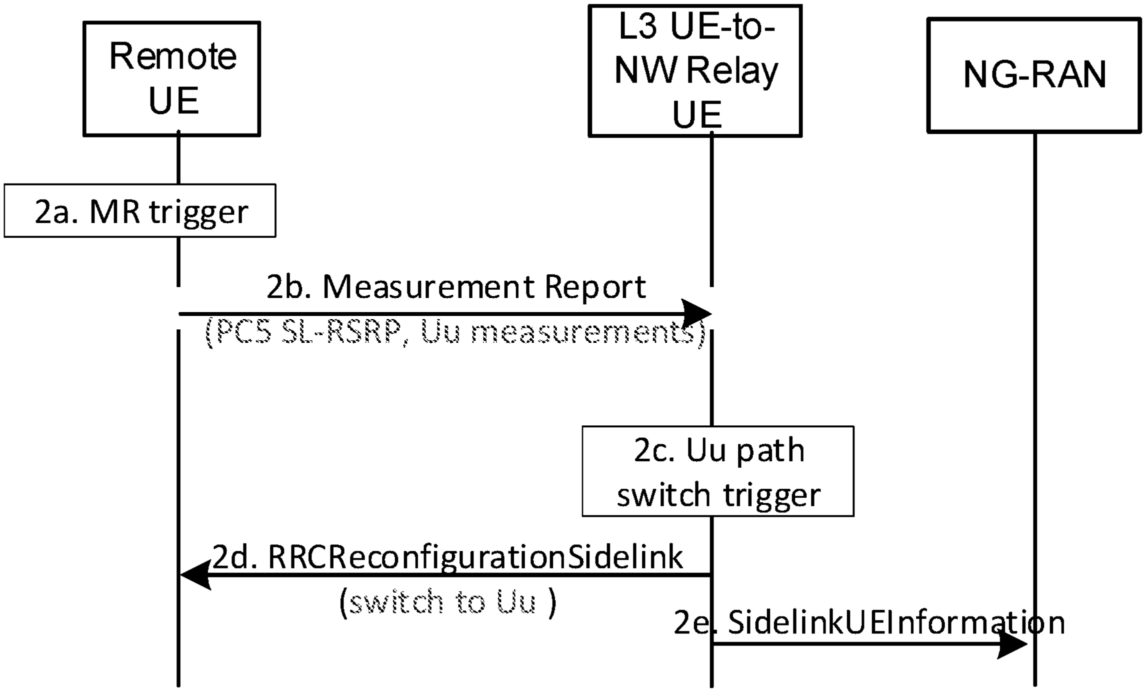
FIG. 9 illustrates an example mobility procedure to switch a remote UE from an indirect network connection via a relay UE to a direct network connection, that may be triggered in accordance with certain aspects of the present disclosure.
Figure 10:
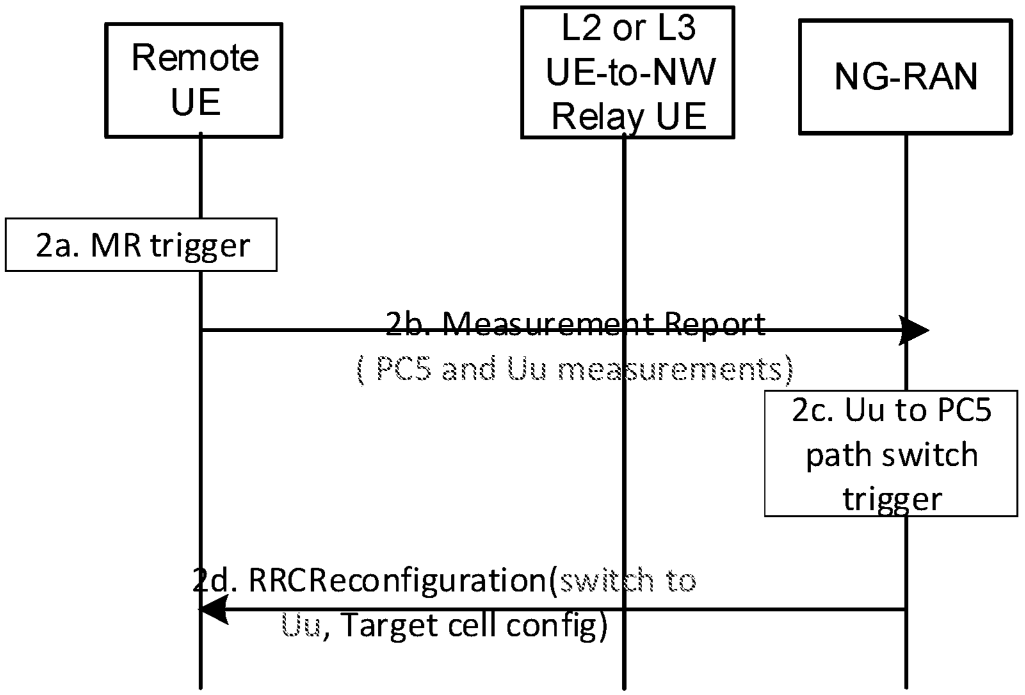
FIG. 10 illustrates another example mobility procedure to switch a remote UE from an indirect network connection via a relay UE to a direct network connection, that may be triggered in accordance with certain aspects of the present disclosure.

FIGS. 8-10 illustrate example mobility procedures that may be triggered in accordance with aspects of the present disclosure.

For example, FIG. 8 illustrates an example mobility procedure with a sidelink relay, where a remote UE is switched from a Uu connection to PC5. In this case, the remote UE may always stay in a CONNECTED state. Thus, as illustrated, it may be up to the network to decide a path/relay target for the handover (HO). The HO may be accomplished as a legacy HO or a conditional HO. This type of mobility procedure may be applied to both L2 and L3 relays.

FIGS. 9 and 10 illustrate example mobility procedures with a sidelink relay, where the remote UE is switched to a Uu connection from a PC5 connection. In the approach shown in FIG. 9, the remote UE may be in IDLE, INACTIVE, out of coverage (OOC) or CONNECTED state for the network (NG-RAN). In this example, the relay makes the HO decision (to switch the remote UE to Uu). This approach typically applies only to L3 relays. In the example shown in FIG. 10, the network makes the HO decision (this approach may be applied to both L2 and L3 relays). In either approach, the HO may be accomplished as a legacy HO or a conditional HO.

Figure 11:
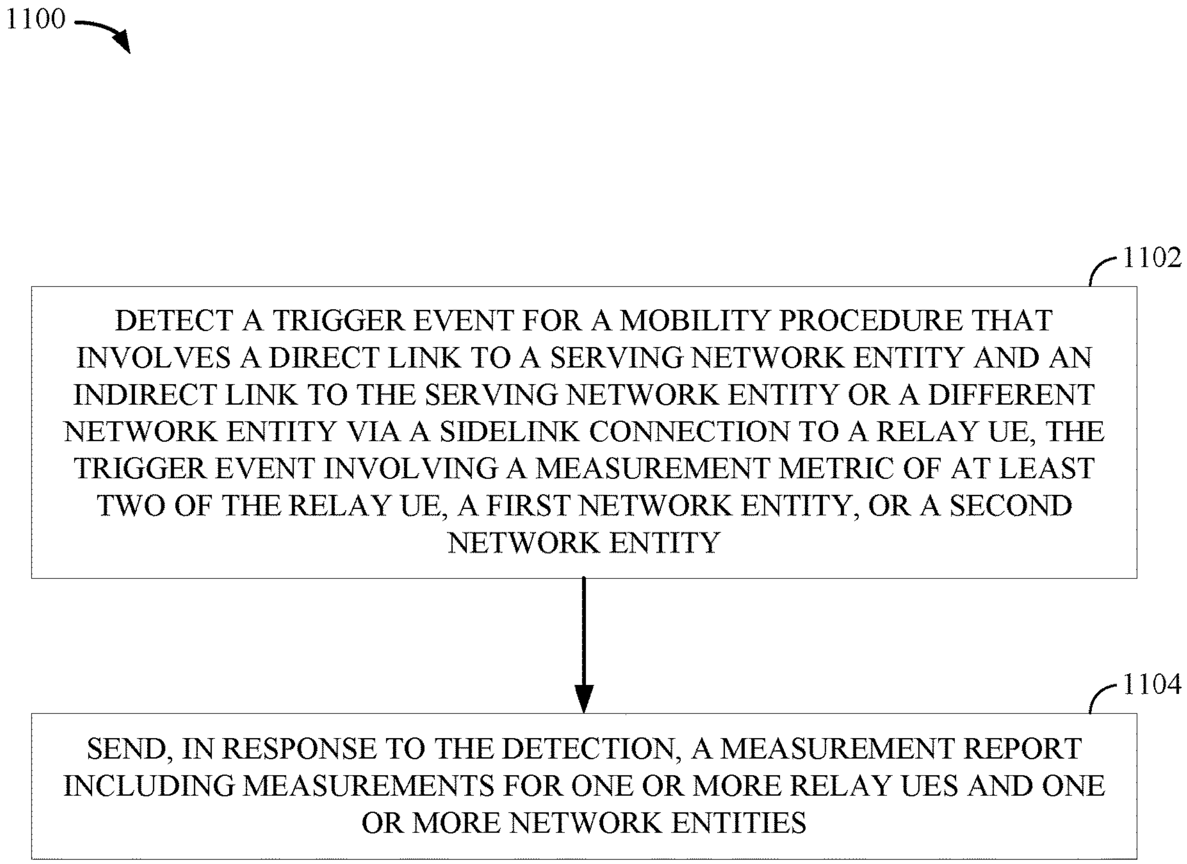
FIG. 11 illustrates example operations for wireless communications by a remote UE, in accordance with certain aspects of the present disclosure.
Figure 12:
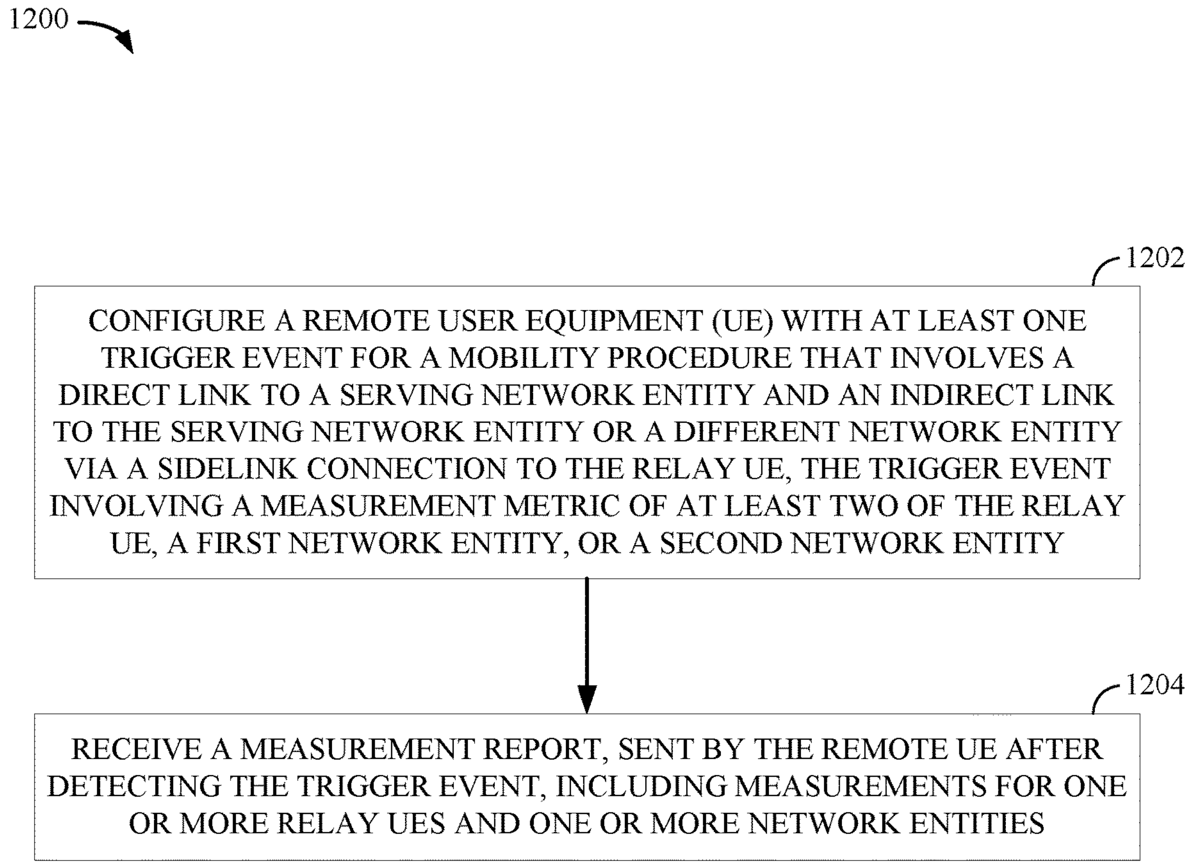
FIG. 12 illustrates example operations for wireless communications by a relay UE, in accordance with certain aspects of the present disclosure.
Figure 13:
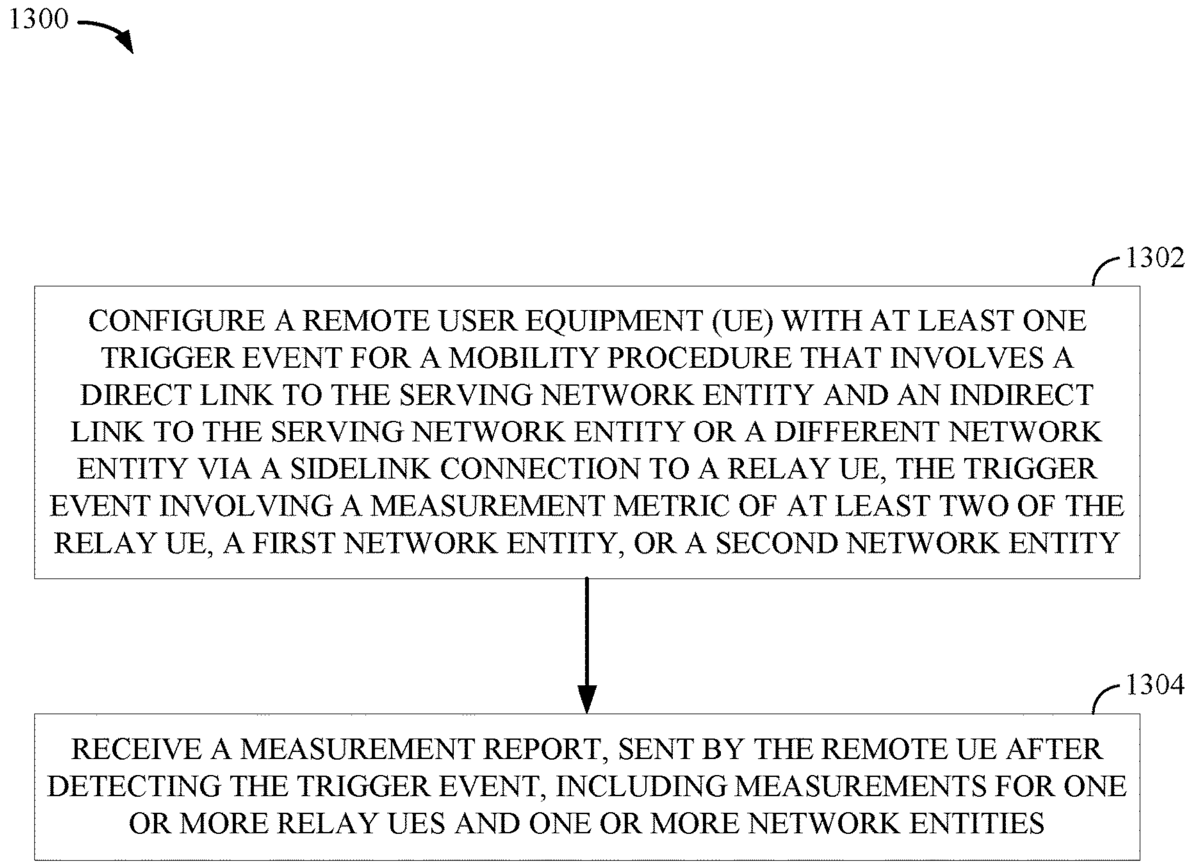
FIG. 13 illustrates example operations for wireless communications by a network entity, in accordance with certain aspects of the present disclosure.

FIGS. 11, 12, and 13, illustrate example operations that may be performed by a remote UE, relay UE, and network entity (e.g., gNB), respectively, to help achieve efficient switching of a remote UE between Uu and PC5 connections, in accordance with aspects of the present disclosure.

FIG. 11 illustrates example operations 1100 that may be performed by a remote UE to trigger a switch between a direct (Uu) and indirect (PC5) connection, in accordance with aspects of the present disclosure. Operations 1100 may be performed, for example, by a UE 120 of FIG. 1 or FIG. 4.

Operations 1100 begin, at 1102, by detecting a trigger event for a mobility procedure that involves a direct link to a serving network entity and an indirect link to the serving network entity or a different network entity via a sidelink connection to a relay UE, the trigger event involving a measurement metric of at least two of the relay UE, a first network entity, or a second network entity. At 1104, the remote UE sends, in response to the detection, a measurement report including measurements for one or more relay UEs and one or more network entities.

FIG. 12 illustrates example operations 1200 that may be performed by a relay node. For example, operations 1200 may be performed by a relay UE (e.g., a relay UE 120*r* of FIG. 1) to configure a remote UE (performing operations 1100 of FIG. 11) for a mobility trigger event to switch the remote UE between PC5 and Uu.

Operations 1200 begin, at 1202, by configuring a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity. At 1204, the relay UE receives a measurement report, sent by the remote UE after detecting the trigger event, including measurements for one or more relay UEs and one or more network entities.

FIG. 13 illustrates example operations 1300 that may be performed by a network entity. For example, operations 1300 may be performed by a base station 110 of FIG. 1 or FIG. 4 (e.g., a gNB) to configure a remote UE (performing operations 1100 of FIG. 11) for a mobility trigger event to switch the remote UE between Uu and PC5.

Operations 1300 begin, at 1302, by configuring a remote user equipment (UE) with at least one trigger event for a mobility procedure that involves a direct link to the serving network entity and an indirect link to the serving network entity or a different network entity via a sidelink connection to a relay UE, the trigger event involving a measurement metric of at least two of the relay UE, a first network entity, or a second network entity. At 1304, the network entity receives a measurement report, sent by the remote UE after detecting the trigger event, including measurements for one or more relay UEs and one or more network entities.

In case the mobility procedure is for a switch from Uu to PC5 (e.g., as shown in FIG. 8), after detecting the event trigger, the remote UE may report all the available Uu and PC5 (relay) measurements to the network. The remote UE may be configured to monitor for various events in such cases to trigger measurement reporting in such cases.

For example, one event may be similar to the A2 event described above (Serving Uu becomes worse than threshold). In some cases, however, a separate quality threshold may be used for a switch from Uu to PC5.

Another trigger event may be when both serving and neighbor gNBs become worse than a threshold. This may help ensure that a CONNECTED remote UE attempts Uu mobility first, and then considers a switch to a relay.

Another trigger event may be when the serving Uu becomes worse than a first threshold (threshold1) and one relay becomes better than a second threshold (threshold2). Another trigger event may be when the serving and a neighbor Uu becomes worse than threshold1 and one relay becomes better than threshold2. In such cases, threshold1 and threshold2 may be designed by taking the above-mentioned delay (of forwarding processing in relay) and delta (margin) into consideration.

Another trigger event may be when one relay becomes an offset value better than the serving Uu. In such cases, the network (e.g., serving gNB) may need to indicate the offset between Uu measurements and PC5 measurements to the UE (e.g., via a Uu RRC or SIB or preconfiguration). In some cases, the offset value may be negative (e.g., to account for differences in scale of the PC5/Uu measurement metrics. The measurement metric may be reference signal receive power (RSRP), reference signal receive quality (RSRQ), signal to interference and noise ratio (SINR), or any type of measurement metric suitable for making mobility decisions.

After detecting one of these trigger events, the remote UE may send a measurement report with various contents. For example, upon detecting one of the trigger events described above, the remote UE may send one or more of the following information to the network (e.g., via a Uu MeasureReport message): available Uu RRM measurements (e.g. RSRP/RSRQ) and their corresponding cell ID(s) (PCI or CGI), available PC5 (relay) measurements (e.g. SD-RSRP), their corresponding relay UE ID(s), and the following relay assistance information for each relay. The relay assistance information may include, for example, load information (CBR or resource utilization) of the relay, battery/power information of the relay, and/or Cell IDs (e.g., PCI or CGI) associated with the relay. In some case, the relay UE may convey such information in the discovery messages or in relay discovery additional information messages.

After receiving the measurement report, in response, the network may send RRC reconfiguration message including a selected PC5 relay UE ID and a relay path ID.

In case the mobility procedure is for a switch from PC5 to Uu controlled by a relay UE (e.g., as shown in FIG. 9), after detecting the event trigger, the remote UE may report all the available Uu and PC5 (relay) measurements to the relay UE. The remote UE may be configured to monitor for various events in such cases to trigger measurement reporting in such cases.

For example, one event may be similar to an existing event S2, where a Serving peer UE SL-RSRP becomes worse than threshold. Another trigger event may be when the serving relay (peer UE SL-RSRP) becomes worse than a first threshold (threshold)) and a serving Uu becomes better than a second threshold (threshold2). In this context, the serving Uu may refer to the Uu network entity (gNB) associated with the connected relay node. The intent of this approach may be to help ensure the serving Uu is given the highest HO priority to reduce HO latency. A related event may be when the serving (peer UE SL-RSRP) relay becomes worse than threshold1 and either the Serving Uu or a neighbor Uu becomes better than threshold2.

The trigger events described above may be configured by a relay UE (e.g., via a PC5 RRC message).

Upon detecting a trigger event, the remote UE may report all available Uu measurements and PC5 SL-RSRP to the relay node. The relay node may decide on a PC5 to Uu path switch, based on remote UE measurement reporting. The relay node may then send a HO command (e.g., via RRCReconfigurationSidelink) to the remote UE and may also send (e.g., via a SidelinkInformation message) notification of the switch to the network.

In case the mobility procedure is for a switch from PC5 to Uu controlled by a network entity (e.g., as shown in FIG. 10), after detecting the event trigger, the remote UE may report all the available Uu and PC5 (relay) measurements to the network via the relay. For example, the relay UE may report the Uu measurements to the network via existing Uu RRM framework and trigger event.

The remote UE may be configured to monitor for various events to trigger measurement reporting when PC5 to Uu switching is controlled by a network entity.

For example, one event may be similar to an existing event S2 where a Serving (peer UE SL-RSRP) becomes worse than threshold. In this case, however, the measurement is reported to the network (and not to the relay).

Another trigger event may be similar to existing event A4 (Neighbour Uu becomes better than threshold). Another trigger event may be when a serving relay (peer UE SL-RSRP) becomes worse than a first threshold (threshold1) and one Uu becomes better than a second threshold (threshold2).

Another trigger event may be when one Uu becomes an offset value better than the serving peer relay UE. In such cases, the network may indicate the offset value (e.g., b/w a measurement at the Uu and a measurement at PC5) via Uu RRC signaling, via a SIB, or the UE may be preconfigured with the offset value. As noted above, the measurement metrics may be RSRP, RSRQ, or SINR, and the offset can be negative.

Upon detecting the trigger event, the remote UE may report all available Uu and PC5 measurements to the network. In this case, it may be up to the network to select the final target cell for HO (e.g., similar to an intra-Uu handover). The measurement report may include Uu RRM measurements, for example, RSRP/RSRQ and their corresponding cell IDs (e.g., PCI or CGI). The PC5 (relay) measurements may include SL-RSRP, their corresponding relay UE IDs and Cell IDs (e.g., PCI or CGI) associated with the relay.

As described herein, aspects of the present disclosure provide techniques for a mobility trigger event for switching a remote UE between a direct connection to a network and an indirect connection to the network via a relay UE connected to a relay. As described above, various trigger events may be defined to accommodate different scenarios (e.g., Uu to PC5 switching, PC5 to Uu switching controlled by a relay, and PC5 to Uu switching controlled by the network). In some cases, the network triggers may be designed to meet certain objectives (e.g., to prioritize trying Uu to Uu mobility first or to give a serving Uu higher priority to reduce handover latency).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 11, 12, and 13 may be performed by various processors shown in FIG. 4, such as processors 466, 458, 464, and/or controller/processor 480 of the UE 120*a* and/or processors 420, 430, 438, and/or controller/processor 440 of the BS 110*a*.

Means for receiving may include a receiver such as one or more antennas and/or one or more receive processors illustrated in FIG. 4. Means for transmitting or means for sending may include a transmitter such as one or more antennas and/or one or more transmit processors illustrated in FIG. 4. Means for detecting, means for configuring, means for providing, means for deciding, means for notifying, means for signaling, and means for selecting may include a processing system, which may include one or more processors, such as processors 466, 458, 464, and/or controller/processor 480 of the UE 120*a* and/or processors 420, 430, 438, and/or controller/processor 440 of the BS 110*a* shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11, 12, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a remote user equipment (UE), comprising:
- detecting a trigger event for a mobility procedure that involves;
  - a direct link to a serving network entity; and
  - an indirect link, via a sidelink connection with a relay UE, to the serving network entity or a different network entity, wherein:
    - the trigger event involving a measurement metric of at least two of the relay UE, a first network entity, or a second network entity; and
    - the trigger event further involves measurement metrics for the serving network entity and at least the second network entity each being worse than a first threshold; and
- sending, in response to the detection, a measurement report including measurements for one or more relay UEs and one or more network entities, wherein the measurement report comprises relay assistance information including battery power information of the relay UE.

2. The method of claim 1, wherein the measurement metric comprises at least one of RS received power (RSRP), RS receive quality (RSRQ), or signal to interference and noise ratio (SINR).

3. The method of claim 1, wherein the mobility procedure involves a switch from the direct link to the indirect link.

4. The method of claim 3, wherein the trigger event further involves:
- the measurement metric for at least the relay UE being better than a second threshold.

5. The method of claim 3, wherein:
the trigger event further involves the measurement metric for at least the relay UE becoming an offset value better than another value for the serving network entity,
the method further comprises receiving signaling indicating the offset value, and
the signaling indicating the offset value is received from at least one of the relay UE or the serving network entity.

6. The method of claim 3, wherein:
the measurement report is sent to the serving network entity and includes:
the measurement metrics for one or more network entities and their corresponding cell identifiers (IDs);
the measurement metric for one or more relay UEs and their corresponding relay UE IDs; and
for each of the one or more relay UEs, the relay assistance information further includes at least one of:
load information of the relay UE; or
cell IDs associated with the relay UE.

7. The method of claim 1, wherein the mobility procedure involves a switch from the indirect link to the direct link.

8. The method of claim 7, wherein:
the trigger event involves:
the measurement metric for the relay UE being worse than a first threshold; and
the measurement metric for at least one network entity being better than a second threshold; and
the at least one network entity comprises the serving network entity associated with the relay UE or a network entity neighboring the serving network entity.

9. The method of claim 7, wherein the trigger event is configured via a sidelink radio resource configuration (RRC) message.

10. The method of claim 7, wherein the measurement report is sent to the relay UE and includes:
measurement metrics for one or more network entities and their corresponding cell identifiers (IDs); and
measurement metrics for one or more relay UEs and their corresponding relay UE IDs.

11. The method of claim 7, wherein the trigger event involves:
the measurement metric for the relay UE being worse than a first threshold, and further comprising:
sending the measurement report to the serving network entity.

12. The method of claim 7, wherein:
the trigger event involves the measurement metric for at least one network entity becoming an offset value better than another value for the relay UE,
the method further comprises receiving signaling indicating the offset value, and
the signaling indicating the offset value is received from at least one of the relay UE or the serving network entity.

13. A method for wireless communications by a relay user equipment (UE), comprising:
configuring a remote user equipment (UE) with at least one trigger event for a mobility procedure that involves a direct link to a serving network entity and an indirect link to the serving network entity or a different network entity via a sidelink connection to the relay UE, the trigger event involving a measurement metric of at least two of the relay UE, a first network entity, or a second network entity; and
receiving a measurement report, sent by the remote UE after detecting the trigger event, including measurements for one or more relay UEs and one or more network entities, wherein the measurement report comprises relay assistance information including battery power information of the relay UE.

14. The method of claim 13, wherein the measurement metric comprises at least one of RS received power (RSRP), RS receive quality (RSRQ), or signal to interference and noise ratio (SINR).

15. The method of claim 13, wherein
the trigger event involves the measurement metric for at least one network entity becoming an offset value better than the measurement metric for the relay UE; and
configuring the remote UE with the trigger event comprises providing the remote UE with the offset value.

16. The method of claim 13, wherein the mobility procedure involves a switch from the indirect link to the direct link.

17. The method of claim 16, wherein:
the trigger event involves:
the measurement metric for the relay UE being worse than a first threshold; and
the measurement metric for at least one network entity being better than a second threshold, and
the at least one network entity comprises the serving network entity associated with the relay UE or a network entity neighboring the serving network entity.

18. The method of claim 16, wherein:
the measurement report includes:
measurement metrics for one or more network entities and their corresponding cell identifiers (IDs); and
measurement metrics for one or more relay UEs and their corresponding relay UE IDs, and
the method further comprises:
deciding on a path switch based on the measurement report;
sending a handover command to the remote UE to perform the path switch; and
notifying the serving network entity of the path switch.

19. A method for wireless communications by a serving network entity, comprising:
configuring a remote user equipment (UE) with at least one trigger event for a mobility procedure that involves:
a direct link to the serving network entity; and
an indirect link, via a sidelink connection with a relay UE, to the serving network entity or a different network entity, wherein:
the trigger event involving a measurement metric of at least two of the relay UE, a first network entity, or a second network entity; and
the trigger event further involves measurement metrics for the serving network entity and the second network entity each being worse than a first threshold; and
receiving a measurement report, sent by the remote UE after detecting the trigger event, including measurements for one or more relay UEs and one or more network entities, wherein the measurement report comprises relay assistance information including battery power information of the relay UE.

20. The method of claim 19, wherein the measurement metric comprises at least one of RS received power (RSRP), RS receive quality (RSRQ), or signal to interference and noise ratio (SINR).

21. The method of claim 19, wherein the mobility procedure involves a switch from the direct link to the indirect link.

22. The method of claim 21, wherein:

the trigger event further involves the measurement metric for the relay UE being better than a second threshold; and values of the first threshold are selected based on a delay of forwarding processing in the relay UE and a margin.

23. The method of claim 21, wherein the trigger event further involves:

the measurement metric for the serving network entity and the second network entity being worse than a first threshold.

24. The method of claim 21, wherein:

the trigger event further involves the measurement metric for the relay UE becoming an offset value better than another value for the serving network entity; and the method further comprises signaling an indication of the offset value.

25. The method of claim 21, wherein:

the measurement report includes:

the measurement metrics for one or more network entities and their corresponding cell identifiers (IDs); and the measurement metric for one or more relay UEs and their corresponding relay UE IDs; and the method further comprises:

selecting a relay UE based on the measurement report; and sending a radio resource control (RRC) message that includes an indication of the selected relay UE and a corresponding relay path ID.

26. The method of claim 19, wherein the mobility procedure involves a switch from the indirect link to the direct link.

27. The method of claim 26, wherein the trigger event involves:

the measurement metric for the relay UE being worse than a first threshold.

28. The method of claim 26, wherein:

the trigger event involves:

the measurement metric for the relay UE being worse than a first threshold; and the measurement metric for the serving network entity or a network entity neighboring the serving network entity being better than a second threshold, and values of the first threshold are selected based on a delay of forwarding processing in the relay UE and a margin.

29. The method of claim 26, wherein:

the trigger event involves:

the measurement metric for at least one network entity becoming an offset value better than another value for the relay UE, the method further comprises receiving signaling indicating the offset value, and the signaling indicating the offset value is received from at least one of the relay UE or the serving network entity.

30. The method of claim 26, wherein:

the measurement report includes:

the measurement metrics for one or more network entities and their corresponding cell identifiers (IDs); and the measurement metric for one or more relay UEs and their corresponding relay UE IDs, and the method further comprises:

selecting a target network entity for the remote UE based on the measurement report; and sending a command to the remote UE to perform a handover to the selected target network entity.

31. A remote user equipment (UE), comprising:

at least one memory; and one or more processors coupled to the at least one memory, and configured to cause the remote UE to:

detect a trigger event for a mobility procedure that involves:

a direct link to a serving network entity; and an indirect link, via a sidelink connection with a relay UE, to the serving network entity or a different network entity, wherein:

the trigger event involving a measurement metric of at least two of the relay UE, a first network entity, or a second network entity; and the trigger event further involves measurement metrics for the serving network entity and the second network entity each being worse than a first threshold; and send, in response to the detection, a measurement report including measurements for one or more relay UEs and one or more network entities, wherein the measurement report comprises relay assistance information including battery power information of the relay UE.

32. A relay user equipment (UE), comprising:

at least one memory; and one or more processors coupled to the at least one memory, and configured to cause the relay UE to:

configure a remote user equipment (UE) with at least one trigger event for a mobility procedure that involves:

a direct link to a serving network entity; and an indirect link, via a sidelink connection with a relay UE, to the serving network entity or a different network entity, wherein:

the trigger event involving a measurement metric of at least two of the relay UE, a first network entity, or a second network entity; and the trigger event further involves measurement metrics for the serving network entity and the second network entity each being worse than a first threshold; and receive a measurement report, sent by the remote UE after detecting the trigger event, including measurements for one or more relay UEs and one or more network entities, wherein the measurement report comprises relay assistance information including battery power information of the relay UE.

* * * * *